US012187591B2

(12) United States Patent
Kim

(10) Patent No.: US 12,187,591 B2
(45) Date of Patent: Jan. 7, 2025

(54) PALLET CLAMP APPARATUS

(71) Applicant: DOOSAN INDUSTRIAL VEHICLE CO., LTD., Incheon (KR)

(72) Inventor: Woong Kim, Seoul (KR)

(73) Assignee: DOOSAN BOBCAT KOREA CO., LTD., Incheon (KR)

( * ) Notice: Subject to any disclaimer, the term of this patent is extended or adjusted under 35 U.S.C. 154(b) by 356 days.

(21) Appl. No.: 17/704,577

(22) Filed: Mar. 25, 2022

(65) Prior Publication Data

US 2022/0396460 A1 Dec. 15, 2022

(30) Foreign Application Priority Data

Jun. 11, 2021 (KR) ........................ 10-2021-0075848

(51) Int. Cl.
*B66F 9/12* (2006.01)
*B25B 5/06* (2006.01)

(52) U.S. Cl.
CPC . *B66F 9/12* (2013.01); *B25B 5/06* (2013.01)

(58) Field of Classification Search
CPC .... B66F 9/18; B66F 9/185; B66F 9/12; B25B 5/06
See application file for complete search history.

(56) References Cited

U.S. PATENT DOCUMENTS

| | | | | |
|---|---|---|---|---|
| 3,493,137 | A * | 2/1970 | Nilsen | B66F 9/18 414/500 |
| 9,783,400 | B2 | 10/2017 | Wieler | |
| 10,850,962 | B2 * | 12/2020 | Idsäter | B66F 9/18 |
| 2007/0014654 | A1 * | 1/2007 | Haverfield | B66F 9/183 414/621 |
| 2016/0175134 | A1 | 6/2016 | Ghahfarokhi et al. | |
| 2019/0359459 | A1 | 11/2019 | Schwarz et al. | |

FOREIGN PATENT DOCUMENTS

| | | | |
|---|---|---|---|
| JP | 2003-206096 | A | 7/2003 |
| KR | 10-2012-0071038 | A | 7/2012 |

OTHER PUBLICATIONS

Office Action of a counterpart Korean Patent Application No. 10-2021-0075848 dated Nov. 8, 2022.
Search Report of a counterpart European Patent Application No. 22165108.6 dated Sep. 27, 2022.

* cited by examiner

*Primary Examiner* — Glenn F Myers
(74) *Attorney, Agent, or Firm* — Volpe Koenig

(57) ABSTRACT

According to various example embodiments, a pallet clamp apparatus for clamping a pallet to a pair of forks provided in a forklift includes a housing disposed adjacent to each of the pair of forks, a locking member, at least a portion of the locking member protruding to the outside of the housing to fix the pallet, a spring member configured to elastically press the locking member toward the inner side of the fork in a lateral direction, and a release member configured to release fixing of the locking member by pressing the spring member.

12 Claims, 12 Drawing Sheets

PALLET CLAMP APPARATUS

BACKGROUND

1. Field of the Invention

One or more example embodiments relate to a pallet clamp apparatus, and more particularly, to a pallet clamp apparatus for fixing a pallet to a fork of a forklift.

2. Description of the Related Art

In general, a support called a pallet is used to move a load using a forklift.

A fork is inserted into a tunnel of the pallet while the load is loaded on the pallet and the pallet is lifted.

However, since the weight of the pallet and the load is supported with no separate fixing device in a state in which the fork is inserted into the pallet, there may arise an issue that the pallet is separated from the fork In the process of transporting the load.

SUMMARY

Example embodiments have been made in an effort to solve the above issue, and provide a pallet clamp apparatus for fixing a pallet to a fork of a forklift.

According to various example embodiments, there is provided a pallet clamp apparatus for clamping a pallet to a pair of forks provided in a forklift including a housing disposed adjacent to each of the pair of forks, a locking member, at least a portion of the locking member protruding to the outside of the housing to fix the pallet, a spring member configured to elastically press the locking member toward an inner side of the fork in a lateral direction, and a release member configured to release fixing of the locking member by pressing the spring member.

Preferably, the locking member may include a pair of main plates spaced apart in a vertical direction and disposed parallel to each other, a support plate disposed at an outer end of the main plate, and a first stopper disposed on an inner end of the main plate.

Preferably, a guide protrusion configured to guide lateral movement of the locking member may be formed on the main plate.

Preferably, the release member may be configured to press the spring member via the support plate in a direction in which the spring member is compressed.

Preferably, an inner surface of the support plate may be in contact with the release member and a socket ring configured to fix an outer end of the spring member may be disposed on an outer surface of the support plate.

Preferably, the socket ring may be disposed to be eccentric toward the front in an outer surface of the support plate.

Preferably, the outer end of the main plate may be disposed to be eccentric toward the rear in an inner surface of the support plate.

Preferably, the release member may be rotatably coupled to the inside of the housing, and may be rotated so as to press an inner surface of the support plate by having one side pulled rearward by a pulling member.

Preferably, the release member may include a shaft portion rotatably coupled to the main plate, a contact portion formed to extend in a direction away from the shaft portion to press the inner surface of the support plate, and a pulling portion configured to rotate the contact portion with respect to the shaft portion by being pulled rearward by the pulling member.

Preferably, the release member may include a concave portion formed concavely inwardly between the contact portion and the pulling portion.

Preferably, a guide slit configured to guide lateral movement of the guide protrusion may be formed in the housing.

Preferably, a locking threshold configured to be in contact with an outer end of the guide protrusion to limit movement of the guide protrusion may be formed on an inner circumferential surface of the guide slit.

Preferably, the pulling member may be provided with one end connected to the pulling portion to rotate the release member by an operator's manipulation.

Preferably, the pallet clamp apparatus may include a bracket configured to couple the housing movably in the lateral direction to a carriage disposed in front of the forklift.

Preferably, a moving slit formed to extend in the lateral direction may be formed in the bracket, and the housing may be coupled to the carriage via the moving slit.

According to a pallet clamp apparatus of various example embodiments, it is possible to prevent a safety accident by fixing a pallet to a fork during operation.

Further, it is possible to prevent forced separation of the pallet by an external force through a first stopper and a locking threshold structure.

DETAILED DESCRIPTION

Figure 1:
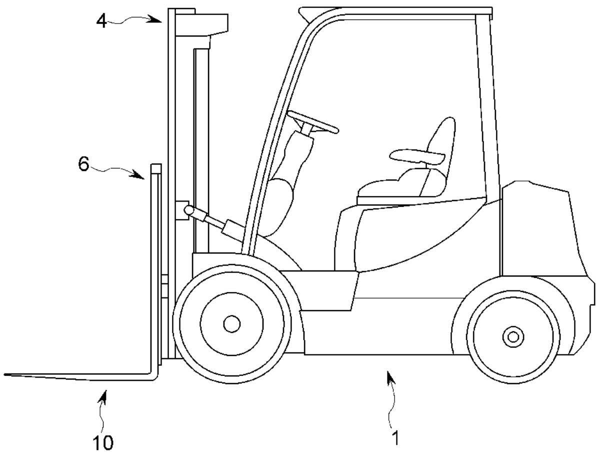
FIG. 1 is a diagram illustrating a forklift to which a pallet clamp apparatus according to various example embodiments is applied.

Hereinafter, some example embodiments will be described with reference to exemplary drawings for convenience of description. In describing reference numerals for elements in each drawing, the same components are denoted by the same reference numeral as much as possible even if they are illustrated in different drawings.

Terms or words used in the present specification and claims should not be limited to their ordinary or dictionary meanings, and should be construed as meanings and concepts consistent with the technical idea of the present disclosure based on the principle that the inventors may appropriately define concepts of terms in order to best describe their invention. In addition, in describing elements of example embodiments, terms such as first, second, A, B, (a), (b), and the like may be used. These terms are merely for distinguishing the elements from other elements, and the essence, order, or sequence of the elements is not limited by the terms. In the case that an element is described as being 'connected' or 'coupled' to another element, the element may be directly connected or coupled to the other component, but it should be understood that another element may be 'connected' or 'coupled' between the element and the other element.

Therefore, the example embodiments described in the present specification and configurations shown in the drawings are merely the most preferred embodiments of the present disclosure and do not represent all technical ideas of the present disclosure. Thus, it should be understood that there may be various equivalents and variations that might be substituted for them at the time of filing the present application. In addition, detailed descriptions of well-known functions and configurations that may unnecessarily obscure the gist of the present disclosure will be omitted.

Hereinafter, the direction in which a fork 10 is installed on a vehicle body 1 of a forklift may be described as forward, and the opposite direction may be described as rearward.

Hereinafter, a direction in which the fork 10 extends may be described as a longitudinal direction or a front-back direction, and a direction perpendicular thereto may be described as a lateral direction or a left-right direction. In addition, the direction in which a pair of the forks 10 face each other may be described as inner (or inward), and the opposite direction may be described as outer (or outward).

Hereinafter, a pallet clamp apparatus 100 according to various example embodiments will be described in detail with reference to the accompanying drawings.

Figure 2:
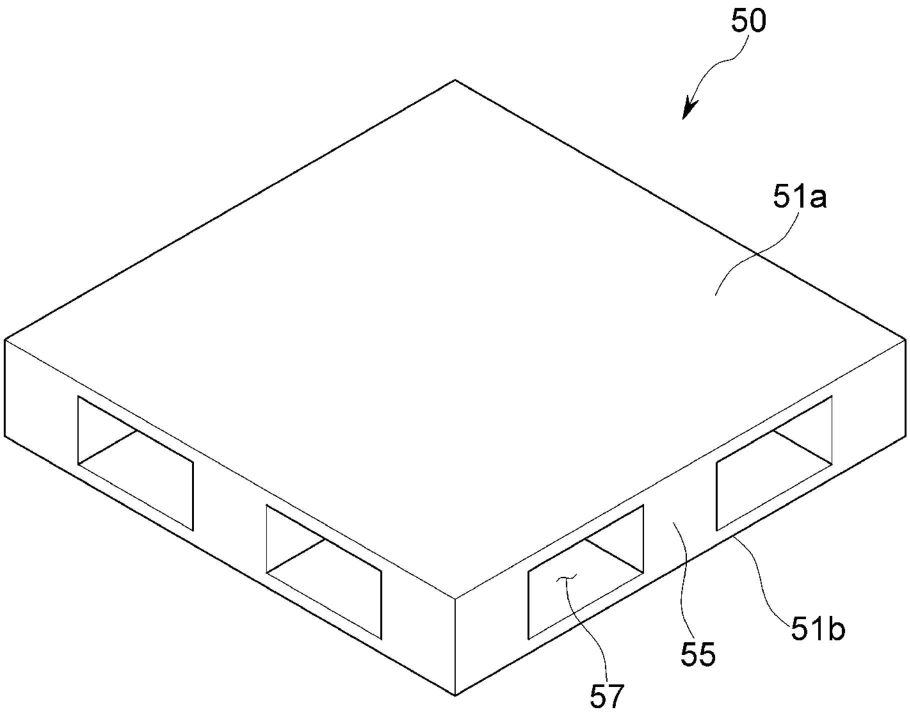
FIG. 2 is a perspective view of a pallet fixed to a fork by a pallet clamp apparatus according to various example embodiments.
Figure 3:
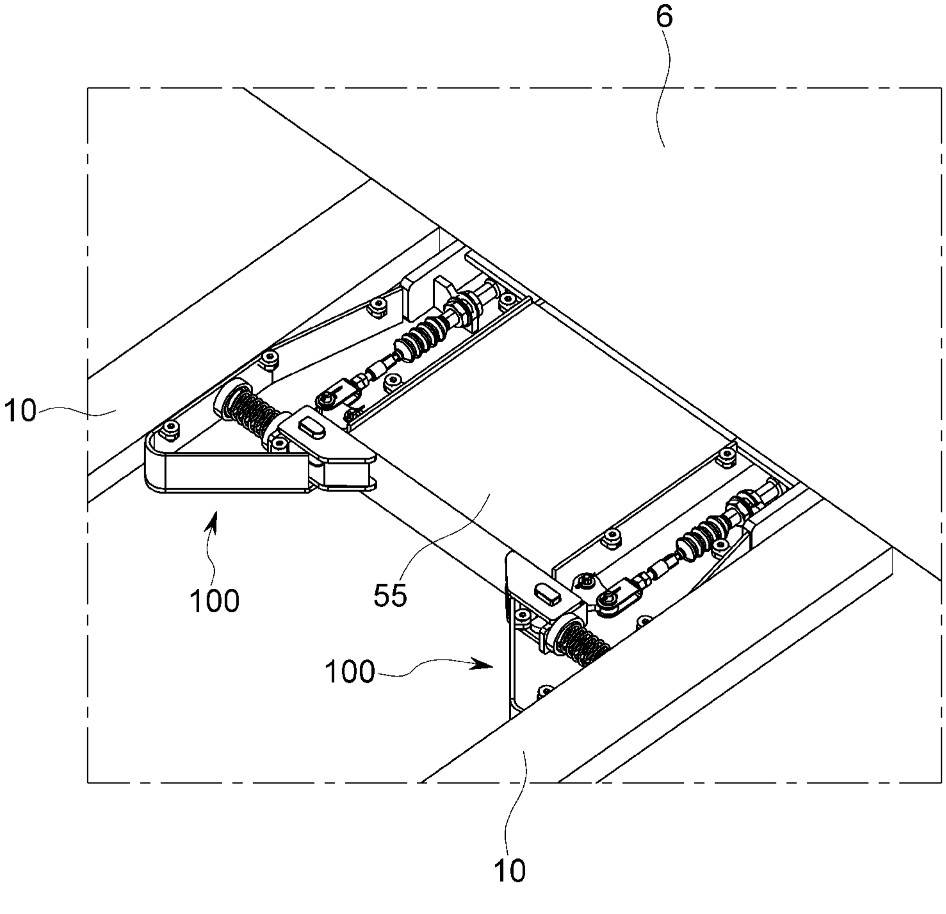
FIG. 3 is a perspective view showing a state in which a pillar of a pallet is fixed by a pallet clamp apparatus according to various example embodiments.
Figure 4:
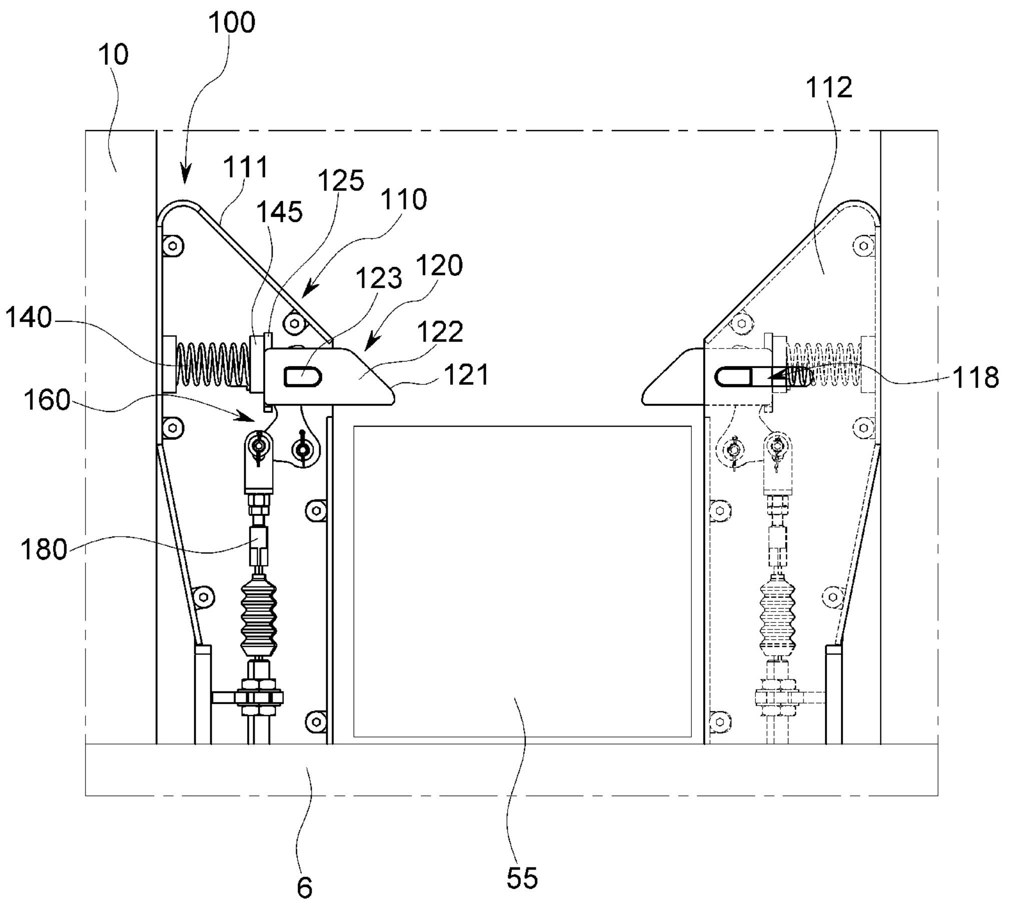
FIG. 4 is a top view showing the state of FIG. 3 viewed from the top.
Figure 5A:
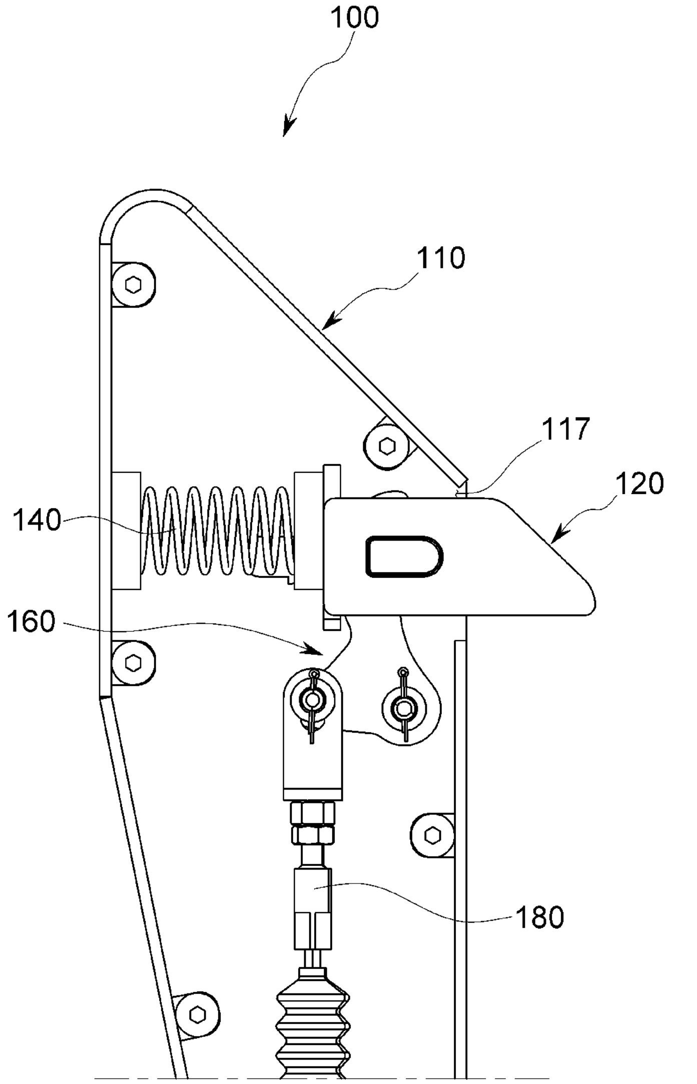
FIG. 5A is a top view illustrating a position of a locking member in a state in which a pallet is fixed by a pallet clamp apparatus according to various example embodiments.
Figure 5B:
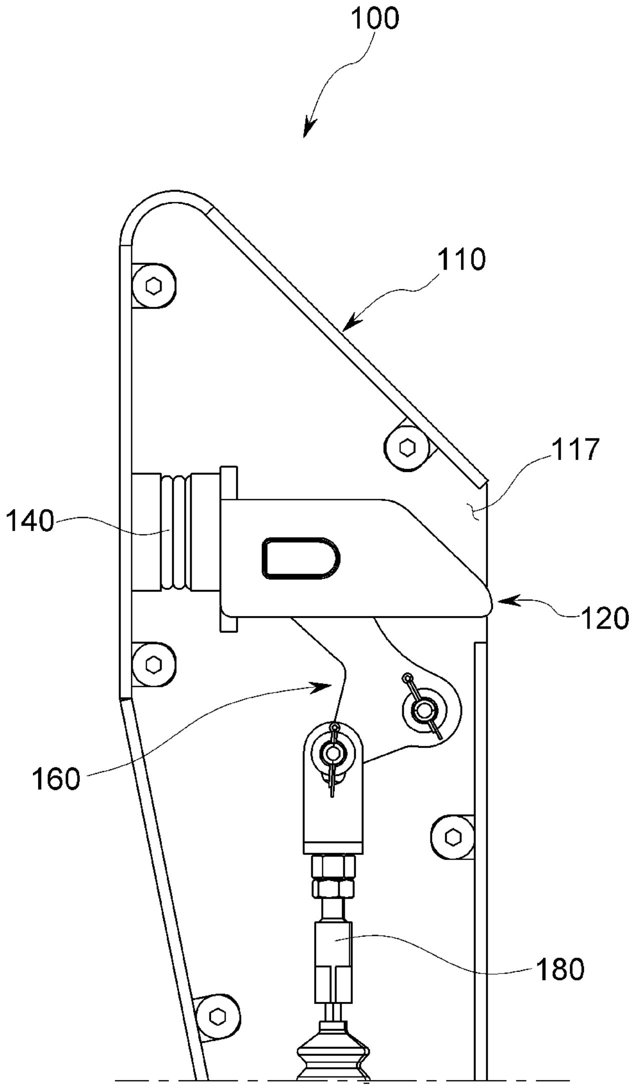
FIG. 5B is a top view illustrating a position of the locking member in a state of releasing the fixed pallet by the pallet clamp apparatus according to various example 5 embodiments.
Figure 6:
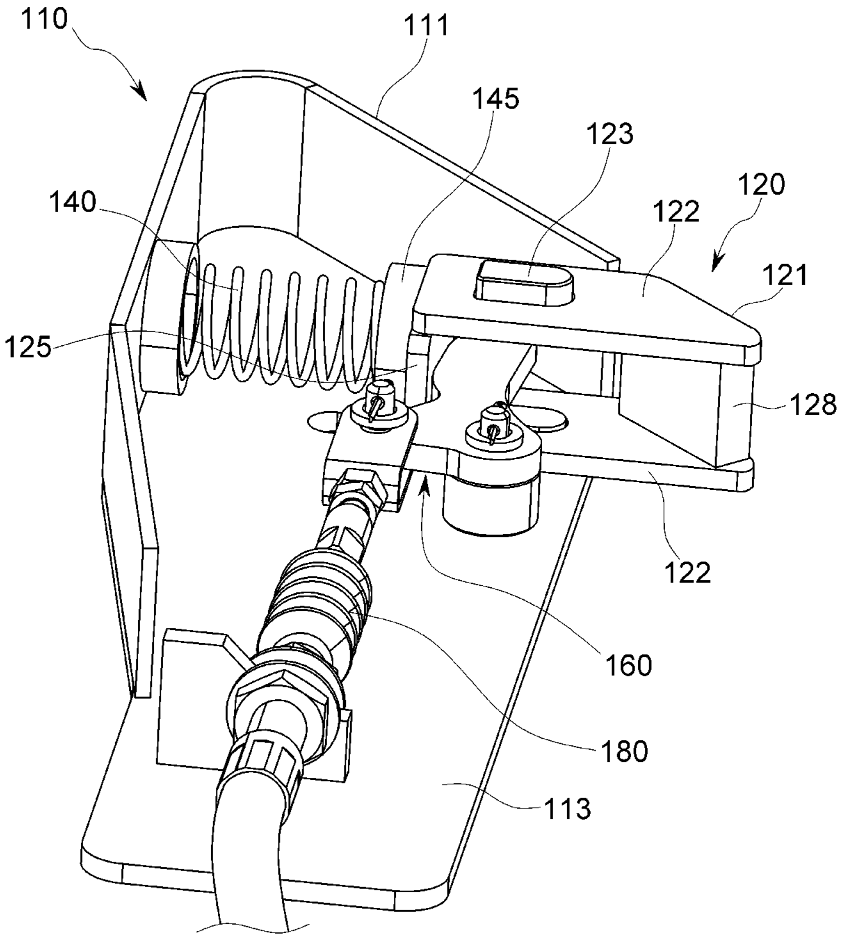
FIG. 6 is a perspective view illustrating a coupling relationship of each element in the inner space of a housing of a pallet clamp apparatus according to various example embodiments.
Figure 7:
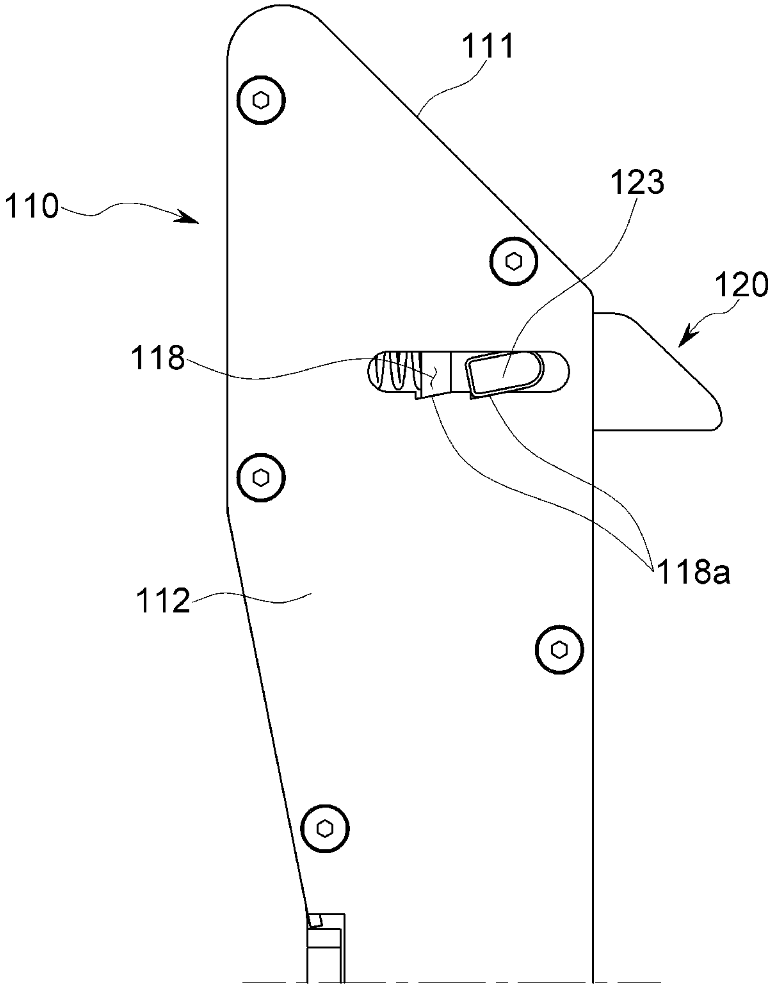
FIG. 7 is a top view illustrating a locking threshold of a guide slit according to an example embodiment.
Figure 8:
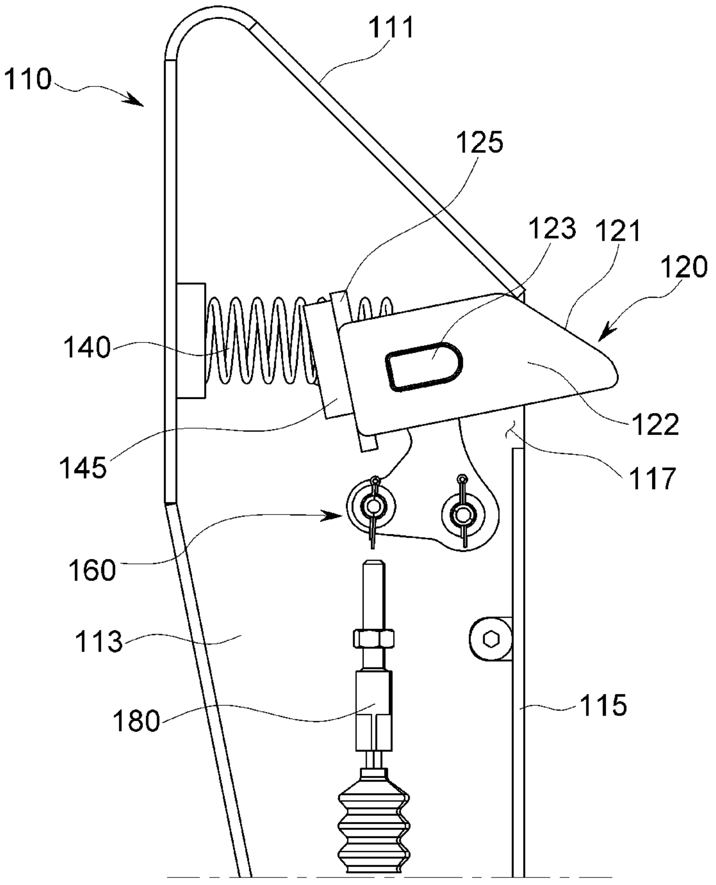
FIG. 8 is a top view illustrating an operation for releasing the state in which a locking member of a pallet clamp apparatus according to various example embodiments is fastened by an external force.
Figure 9:
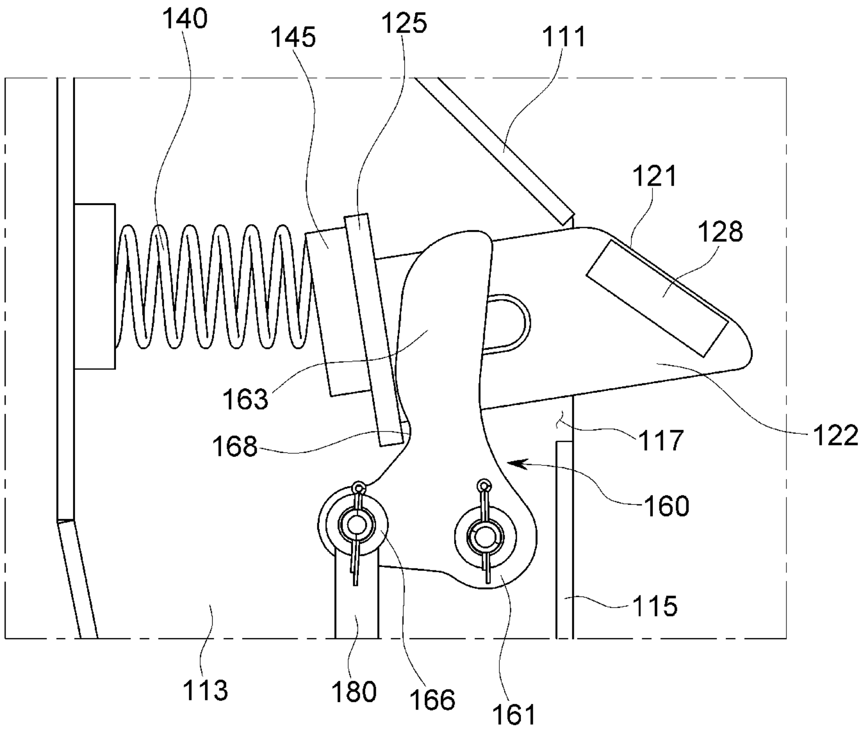
FIG. 9 is an enlarged view of an operation of a release member in the state of FIG. 8.
Figure 10:
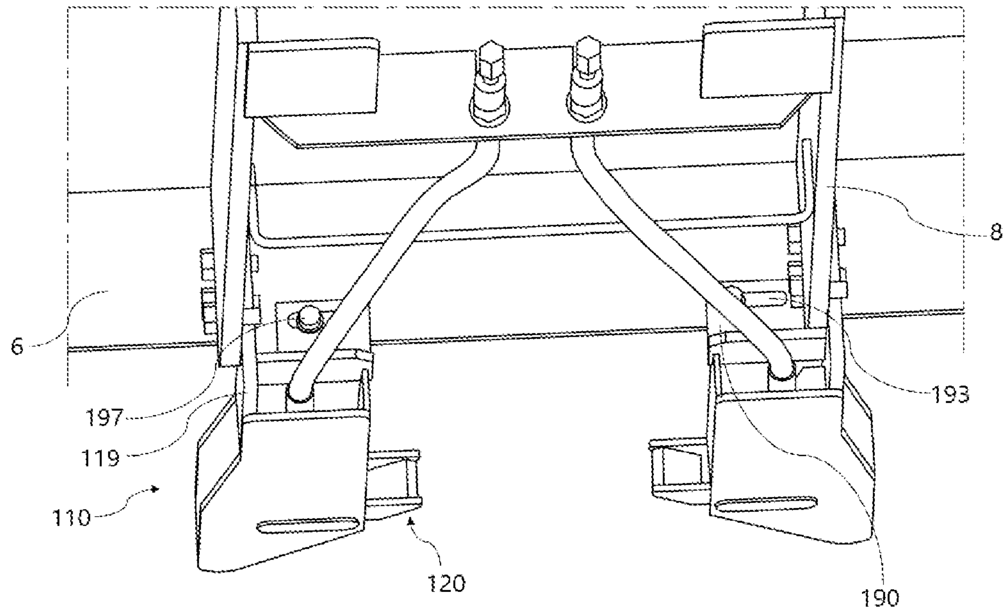
FIG. 10 is a diagram illustrating a coupling structure of a pallet clamp apparatus according to an example embodiment.
Figure 11:
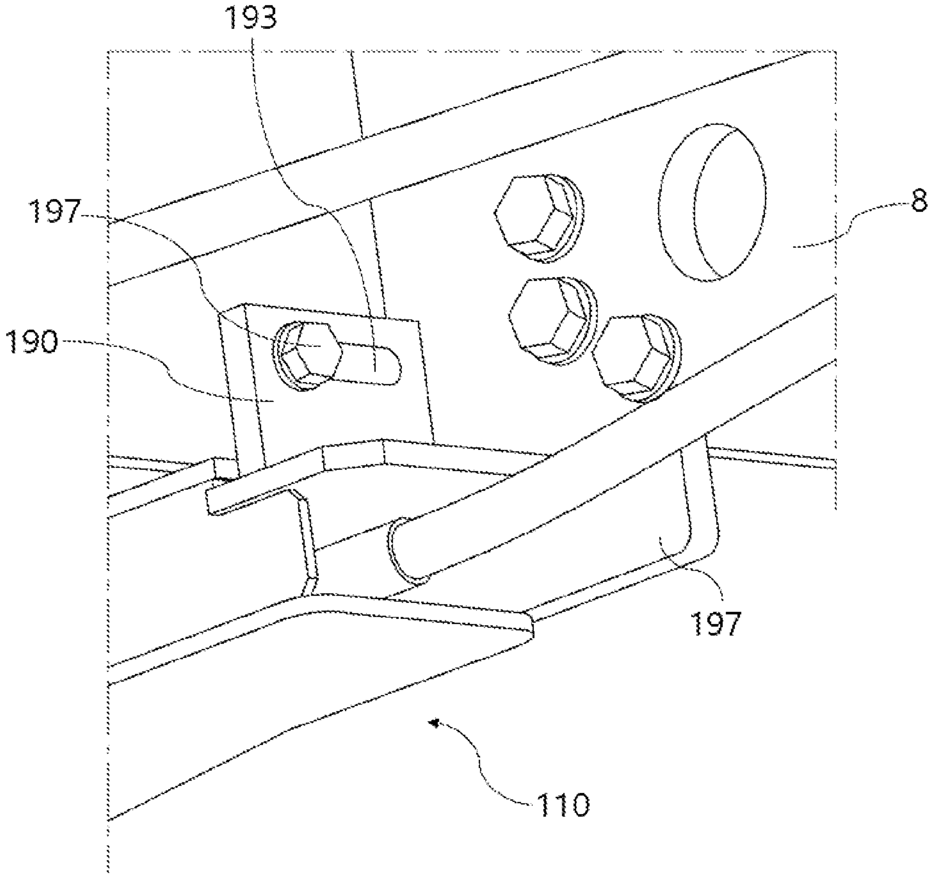
FIG. 11 is an enlarged view illustrating a coupling structure of a housing on the right side of FIG. 10.

FIG. 1 is a diagram illustrating a forklift to which the pallet clamp apparatus 100 according to various example embodiments is applied, FIG. 2 is a perspective view of a pallet fixed to the fork 10 by the pallet clamp apparatus 100 according to various example embodiments, FIG. 3 is a perspective view showing a state in which a pillar 55 of a pallet 50 is fixed by the pallet clamp apparatus 100 according to various example embodiments, FIG. 4 10 is a diagram of a top view showing the state of FIG. 3 viewed from the top, FIG. 5A (a) is a diagram of a top view illustrating a position of a locking member 120 in a state in which the pallet 50 is fixed by the pallet clamp apparatus 100 according to various example embodiments, FIG. 5B (b) is a diagram of a top view illustrating a position of the locking member 120 in a state of releasing the fixed pallet 50 by the pallet clamp apparatus 100 according to various example 15 embodiments, FIG. 6 is a perspective view illustrating a coupling relationship of each element in the inner space of a housing 110 of the pallet clamp apparatus 100 according to various example embodiments, FIG. 7 is a diagram of a top view illustrating a locking threshold 118*a* of a guide slit 118 according to an example embodiment, FIG. 8 is a diagram of a top view illustrating an operation for releasing the state in which the locking member 120 of the pallet 20 clamp apparatus 100 according to various example embodiments is fastened by an external force, FIG. 9 is an enlarged view of an operation of a release member 160 in the state of FIG. 8, FIG. 10 is a diagram illustrating a coupling structure of a pallet clamp apparatus according to an example embodiment, and FIG. 11 is an enlarged view illustrating a coupling structure of a housing on the right side of FIG. 10.

As shown in FIG. 1, the forklift is used to lift or transport heavy loads, has the vehicle body 1 as shown in FIG. 1, and a mast 4 is installed in front of the vehicle body 1. The mast 4 is equipped with a mast rail and a carriage 6 which is movable up and down along the mast rail. The carriage 6 is equipped with the pair of forks 10 that actually lift the load so that an interval between the forks 10 may be adjusted.

Referring to FIG. 2, the pallet 50 on which the load is loaded has a structure in which tunnels 57 into which the forks 10 may be inserted is formed, and the pillar 55 formed in the vertical direction between an upper plate Ma and a lower plate 51*b* of the pallet 50 may be disposed between the tunnels 57. The pallet 50 may be lifted by controlling the forks 10 while the forks 10 are inserted into the tunnels 57. However, since the forks 10 have no structure for fixing the pallet 50, there is an issue that the pallet 50 may be separated from the forks 10 during operation.

Referring to FIGS. 3 to 9, the pallet clamp apparatus 100 according to various example embodiments is installed on the forks 10 of the forklift to fix the pallet 50 to the forks 10 to prevent separation of the pallet 50 during the operation, and may include the housing 110, the locking member 120, a spring member 140, the release member 160, and a pulling member 180.

In one embodiment, the housing 110 may be disposed adjacent to each of the pair of forks 10. The housing 110 may be disposed adjacent to inner surfaces of the forks 10 facing each other. In other words, a pair of the housings 110 may be disposed between the pair of forks 10 to face each other. A predetermined space may be formed inside the housing 110. The spring member 140 may be disposed in the inner space of the housing 110, and at least a portion of the locking member 120 and the release member 160 may be accommodated therein. When the pair of forks 10 are inserted into the tunnels 57 of the pallet 50, the pillar 55 of the pallet 50 is positioned between the pair of housings 110.

In one example embodiment, the housing 110 may be coupled to the carriage 6 via a bracket 190. The housing 110 may be coupled to the carriage 6 so as to be movable in the lateral direction via the bracket 190. A moving slit 193 extending in the lateral direction may be formed in the bracket 190 and the housing 110 may be bolted to the carriage 6 via the moving slit 193 using a fixing bolt 197, so that the housing 110 may be coupled movably in the lateral direction relative to the carriage 6. In the present disclosure, the housing 110 is movably coupled to the carriage 6 via the bracket 190 as described above, so that an interval between the pair of housings 110 may be adjusted to correspond to spacing of the pillar 55 of the pallet 50.

In one example embodiment, a vertical support plate 8 is formed on the carriage 6, and the rear end of an outer surface 119 of the housing 110 may be coupled to an inner surface or an outer surface of the support plate 8. For example, in a state in which the housing 110 is moved inward in the lateral direction along the moving slit 193, the rear end of the outer surface 119 may be coupled to the inner surface of the support plate 8, as in the housing 110 shown on the left side of FIG. 8. In a state in which the housing 110 is moved outward in the lateral direction along the moving slit 193, the rear end of the outer surface 119 mat be coupled to the outer surface of the support plate 8, as in the housing 110 shown on the right side of FIG. 8. In other words, in one example embodiment, the pair of housings 110 may be fixed to the carriage 6 instead of the fork 10, so that the pair of housings 110 may be disposed at an interval independent of the interval between the pair of forks 10.

A first inclined portion 111 guiding the pillar 55 of the pallet 50 to be easily accommodated between the pair of housings 110 may be formed on a front surface of the housing 110. The first inclined portion 111 may be formed to be inclined toward the rear toward the inner side from the inner surface of the fork 10. At least a portion of the outer surface of the housing 110 may be coupled to the inner surface of the fork 10, and an inner surface 115 of the housing 110 may be formed to face an outer peripheral surface of the pillar 55 of the pallet 50.

A locking hole 117 may be formed at one side of the inner surface 115 of the housing 110 so that the locking member 120 may pass therethrough. The locking member 120 may protrude from the housing 110 through the locking hole 117. In one example embodiment, the locking hole 117 may be formed in a position adjacent to the above-described inclined portion of the front surface of the inner surface 115 of the housing 110.

The guide slit 118 for guiding lateral movement of the locking member 120 may be formed on the top surface 112 of the housing 110. The guide slit 118 may be formed at a position corresponding to the locking hole 117 on the top surface 112 of the housing 110. The guide slit 118 may be formed to penetrate the top surface 112 of the housing 110 in the vertical direction, and extend in the lateral direction by a predetermined length. A guide protrusion 123 formed on the locking member 120 may be accommodated in the guide slit 118, and by moving the guide protrusion 123 along the guide slit 118, the locking member 120 may be moved inward or outward in the lateral direction. In an example embodiment, the front-rear width of the guide slit 118 may be equal to or larger than the front-rear width of the guide protrusion 123. Here, it has been described that the guide slit 118 is formed on the top surface 112 of the housing 110, but the guide slit 118 may be formed on a bottom surface 113 or on both the top surface 112 and the bottom surface 113.

In one example embodiment, at least one locking threshold **118*a* may be formed to be recessed rearward on an inner circumferential surface of the guide slit 118. An outer end of the guide protrusion 123 may be seated in the locking threshold 118*a*. Here, the locking threshold 118*a* formed in the guide slit 118 may be described as a second stopper. Since the outer end of the guide protrusion 123 is seated in the locking threshold 118*a*, the movement of the guide protrusion 123** may be limited.

More specifically, in the process of performing an operation in a state in which the pillar 55 of the pallet 50 is fixed to the fork 10 by the locking member 120, an external force may act so that the pallet 50 may be separated. By this external force, an inner end of the locking member 120 may move forward and an outer end of the locking member 120 moves rearward, so that the locking member 120 may be rotated, and in this process, an issue in which the pallet 50 is separated may occur as the locking member 120 is forcibly pushed outward in the lateral direction.

However, in an example embodiment, even when the locking member 120 is rotated and pushed by an unintentional external force, rotation of the locking member 120 and/or retraction of the locking member 120 outward in the lateral direction by the external force may be limited as the outer end of the locking member 120 is seated in the locking threshold **118*a* of the guide slit 118**.

In the present disclosure, in order to prevent separation of the pallet 50, a position of a spring and a stopper structure are proposed together with the above-described structure of the locking threshold **118*a*. A specific operating mechanism for preventing the pallet 50 from being separated using the locking threshold 118*a*, the spring, and a first stopper 128** will be described later.

When the pillar 55 of the pallet 50 is inserted between the pair of housings 110, the locking member 120 according to various example embodiments protrudes in the inside direction of the housing 110 and is locked on the pillar 55 to fix the pillar 55 for preventing it from being separated.

Referring to FIG. 2, the locking member 120 may be provided to be movable inwardly or outwardly in the lateral direction while at least a portion of the locking member 120 is accommodated in the housing 110. Specifically, the locking member 120 may include a pair of main plates 122 spaced apart from each other in the vertical direction and arranged parallel to each other, a support plate 125 disposed at an outer end of the main plate 122, and the first stopper 128 disposed at an inner end of the main plate 122.

The guide protrusion 123 may be formed on the main plate 122. The guide protrusion 123 may be inserted into the above-described guide slit 118 of the housing 110 to guide the lateral movement of the locking member 120. A second inclined portion 121 may be formed at the inner end of the main plate 122. The second inclined portion 121 may be formed to be inclined rearward toward the inner side so as to be continuous with the above-described first inclined portion 111 of the housing 110.

The first stopper 128 may be disposed along the second inclined portion 121 between the pair of main plates 122. The first stopper 128 is for limiting the rotation when the locking member 120 is rotated by the external force as described above. Since a front end of the first stopper 128 abuts on the first inclined portion 111 formed on the front surface of the housing 110, the rotation of the locking member 120 may be limited. In addition, in a state in which the first stopper 128 abuts on the locking hole 117 of the housing 110, the guide protrusion 123 may be locked by the locking threshold **118*a* of the guide slit 118 as described above and the locking member 120 is no longer rotated and/or laterally pushed by the first stopper 128 and the locking threshold 118*a***.

The support plate 125 may be vertically disposed at the outer end of the main plate 122 in the vertical direction. The inner surface of the support plate 125 may be in contact with the release member 160 to be pressed by the release member 160, and an outer surface of the support plate 125 may be elastically supported by the spring member 140. The support plate 125 may be elastically supported inwardly by the spring member 140. A socket ring 145 for fixing an inner end of the spring member 140 may be disposed on the outer surface of the support plate 125.

The socket ring 145 may be disposed to be eccentric toward the front in the outer surface of the support plate 125. The socket ring 145 is disposed to be biased toward the front end of the outer surface of the support plate 125. In addition, the outer end of the main plate 122 may be disposed to be eccentric toward the rear in the inner surface of the support plate 125. The outer end of the main plate 122 is disposed to be biased toward the rear end of the inner surface of the support plate 125. The arrangement of the socket ring 145 and the main plate 122 with respect to the support plate 125 prevents the locking member 120 from being rotated by the external force separating the pillar 55 of the pallet 50.

Referring to FIG. 3, the spring member 140 may be disposed inside the housing 110, and may elastically press and support the locking member 120 outward. In one example embodiment, the spring member 140 may be provided as a coil-type spring. One end of the spring member 140 may be fixed to the housing 110, and the other end may be coupled to the support plate 125 of the locking member 120 via the socket ring 145. When the operator rotates the release member 160 by manipulating the pulling member 180, the spring member 140 may be compressed. When the spring member 140 is compressed, the locking member 120 may move outward in the lateral direction to be accommodated in the housing 110, and the fixing of the pallet 50 may be released.

Referring to FIG. 3, the release member 160 is for moving the locking member 120 outward against the elastic force of the spring member 140, and may be provided to press the spring member 140 in a direction in which the spring member 140 is compressed.

Referring to FIGS. 4 to 9, the release member 160 according to various example embodiments may be rotatably coupled to the inside of the housing 110, and may be provided to press the inner surface of the support plate 125 by having one side pulled rearward by the pulling member 180.

Specifically, the release member 160 may include a shaft portion 161 rotatably coupled to the main plate 122, a contact portion 163 formed to extend in a direction away from the shaft portion 161 to press the inner surface of the support plate 125, and a pulling portion 166 configured to rotate the contact portion 163 with respect to the shaft portion 161 by being pulled rearward by the pulling member 180. Here, the shaft portion 161, the contact portion 163, and the pulling portion 166 have been described, respectively, but they may not be physically separated and each region of the release member 160 formed integrally may be conceptually divided and described.

In one example embodiment, the release member 160 may be provided in a generally triangular shape as shown in FIG. 3, but is not limited thereto.

In one example embodiment, a concave portion 168 formed concavely inwardly may be formed between the contact portion 163 and the pulling portion 166 of the release member 160. When the guide protrusion 123 is locked in the locking threshold **118*a* of the guide slit 118 and falls into a fastened state, the concave portion 168 has a structure for pressing the rear end of the support plate 125** by the operator's manipulation to release the fastened state.

The pulling member 180 may be provided to connect a pedal disposed inside a cabin and the pulling portion 166 of the release member 160. One end of the pulling member 180 may be connected to the pulling portion 166, and the other end may be connected to the pedal. When the operator manipulates the pedal, the pulling portion 166 of the release member 160 connected to the pulling member 180 is pulled toward the rear, and the release member 160 is rotated with respect to the shaft portion 161.

Hereinafter, a method of fixing or releasing the pallet 50 using the pallet clamp apparatus 100 according to various example embodiments will be described.

First, the operator manipulates the pedal to pull the pulling member 180, so that the locking member 120 is moved outward in the lateral direction by the rotation of the release member 160 and accommodated in the housing 110. In this state, when the pair of forks 10 enter the tunnels 57 of the pallet 50 to the end, the pillar 55 of the pallet 50 is positioned between the pair of housings 110.

When the operator releases the pulling of the pulling member 180 by manipulating the pedal again, the locking member 120 moves inward in the lateral direction by the elastic force of the spring member 140 so that the inner end of the locking member 120 protrudes to the outside of the housing 110. At this time, since the locking member 120 protrudes to the outside of the housing 110 in a state in which the pillar 55 of the pallet 50 is positioned between the pair of housings 110, the pillar is unable to escape from between the housings 110 again, so that the pallet 50 is able to be fixed to the fork 10.

Even if the operator does not manipulate the pedal, when an external force is applied in the direction in which the pallet 50 is separated during operation, i.e., toward the front, the locking member 120 may be moved outwardly in the lateral direction while forcibly rotated. In this case, as described above, the rotation of the locking member 120 is limited by the first stopper 128 of the locking member 120, and the movement of the locking member 120 outward in the lateral direction is limited by the structure of the locking threshold **118*a* of the guide slit 118. Thus, it is possible to prevent the fixed state from being forcibly released by the external force applied to the pallet 50**.

In addition, in the case that the guide protrusion 123 is fastened to the locking threshold **118*a* of the guide slit 118 in a state in which the locking member 120 is rotated by the external force, when the operator manipulates the pedal to pull the pulling member 180, the rear end of the support plate 125 may be pressed by the concave portion 168 of the release member 160** to release the fastened state.

When the operator manipulates the pedal again to pull the pulling member 180 in order to release the fixed state of the pallet 50 after the operation is completed, the support plate 125 may be pressed in a direction in which the spring member 140 is compressed as the release member 160 is rotated. When the support plate 125 is pressed outward in the lateral direction, the locking member 120 may be accommodated in the housing 110, and the fixed state of the pillar 55 of the pallet 50 may be released.

In the above, although all elements constituting example embodiments have been described as being combined or operated in combination, the present disclosure is not necessarily limited to the example embodiments. In other words, within the scope of the object of the present disclosure, one or more of all the elements may be selectively combined to operate. In addition, a term such as 'include', 'comprise', or 'have' used above mean that an element may be inherent unless otherwise stated, and it should not be construed as excluding other elements but construed as being able to further include other elements. All terms, including technical or scientific terms, have the same meanings as commonly understood by those skilled in the art to which the present disclosure pertains, unless otherwise defined. Terms commonly used, such as those defined in the dictionary, should be construed as being consistent with the contextual meanings of the related art, and are not construed in ideal or excessively formal meanings unless explicitly defined in the present disclosure.

The above description is merely illustrative of the technical spirit of the present disclosure, and various modifications and variations would be possible without departing from the essential characteristics of the present disclosure by those skilled in the art to which the present disclosure pertains. Therefore, the example embodiments disclosed in the present disclosure are not intended to limit the technical spirit of the invention, but to explain it, and the scope of technical ideas of the invention is not limited by these example embodiments. The protection scope of the invention should be construed by the following claims, and all technical ideas within the scope equivalent thereto should be construed as being included in the scope of the invention.

EXPLANATION OF REFERENCE NUMERALS

1: Vehicle body
4: Mast
6: Carriage
8: Support plate
10: Fork
50: Pallet
51*a*: Upper plate
51*b*: Lower plate
55: Pillar
57: Tunnel
100: Pallet clamp apparatus
110: Housing
111: First inclined portion
112: Top surface
113: Bottom surface
115: Inner surface
117: Locking hole
118: Guide slit
118*a*: Locking threshold
119: Outer surface
120: Locking member
121: Second inclined portion
122: Main plate
123: Guide protrusion
125: Support plate
128: First stopper
140: Spring member
145: Socket ring
160: Release member
161: Shaft portion
163: Contact portion
166: Pulling portion
168: Concave portion
180: Pulling member
190: Bracket
193: Moving slit
197: Fixing bolt

What is claimed is:

1. A pallet clamp apparatus for clamping a pallet to a pair of forks provided in a forklift, comprising:

a housing disposed adjacent to each of the pair of forks;

a locking member, at least a portion of the locking member protruding to the outside of the housing to fix the pallet;

a spring member configured to elastically press the locking member toward an inner side of the fork in a lateral direction; and a release member configured to release fixing of the locking member by pressing the spring member, wherein the locking member comprises:

a pair of main plates spaced apart in a vertical direction and disposed parallel to each other;

a support plate disposed at an outer end of the main plate; and a first stopper disposed on an inner end of the main plate wherein a guide protrusion configured to guide lateral movement of the locking member is formed on the main plate, and wherein an inner surface of the support plate is in contact with the release member and a socket ring configured to fix an outer end of the spring member is disposed on an outer surface of the support plate.

2. The pallet clamp apparatus of claim 1, wherein the release member is configured to press the spring member via the support plate in a direction in which the spring member is compressed.

3. The pallet clamp apparatus of claim 1, wherein the socket ring is disposed to be eccentric toward the front in an outer surface of the support plate.

4. The pallet clamp apparatus of claim 1, wherein the outer end of the main plate is disposed to be eccentric toward the rear in an inner surface of the support plate.

5. The pallet clamp apparatus of claim 1, wherein the release member is rotatably coupled to the inside of the housing, and is rotated so as to press an inner surface of the support plate by having one side pulled rearward by a pulling member.

6. The pallet clamp apparatus of claim 5, wherein the release member comprises:

a shaft portion rotatably coupled to the main plate;

a contact portion formed to extend in a direction away from the shaft portion to press the inner surface of the support plate; and a pulling portion configured to rotate the contact portion with respect to the shaft portion by being pulled rearward by the pulling member.

7. The pallet clamp apparatus of claim 5, wherein the release member comprises a concave portion formed concavely inwardly between the contact portion and the pulling portion.

8. The pallet clamp apparatus of claim 1, wherein a guide slit configured to guide lateral movement of the guide protrusion is formed in the housing.

9. The pallet clamp apparatus of claim 8, wherein a locking threshold configured to be in contact with an outer end of the guide protrusion to limit movement of the guide protrusion is formed on an inner circumferential surface of the guide slit.

10. The pallet clamp apparatus of claim 6, wherein the pulling member is provided with one end connected to the pulling portion to rotate the release member by an operator's manipulation.

11. The pallet clamp apparatus of claim 1, further comprising:

a bracket configured to couple the housing movably in the lateral direction to a carriage disposed in front of the forklift.

12. The pallet clamp apparatus of claim 11, wherein a moving slit formed to extend in the lateral direction is formed in the bracket, and the housing is coupled to the carriage via the moving slit.

* * * * *